A. W. WALL.
CRANK OR CRANK SHAFT OF INTERNAL COMBUSTION ENGINES.
APPLICATION FILED DEC. 27, 1918.
1,336,546.
Patented Apr. 13, 1920.
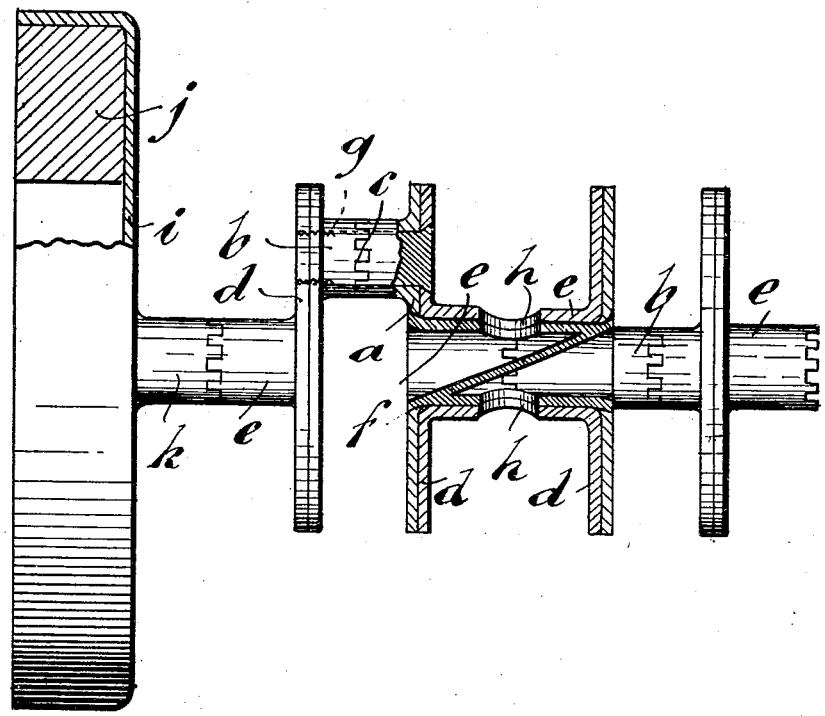

UNITED STATES PATENT OFFICE.

ARTHUR WILLIAM WALL, OF SHELDON, NEAR BIRMINGHAM, ENGLAND.

CRANK OR CRANK-SHAFT OF INTERNAL-COMBUSTION ENGINES.

1,336,546.   Specification of Letters Patent.   Patented Apr. 13, 1920.

Application filed December 27, 1918. Serial No. 268,546.

*To all whom it may concern:*

Be it known that I, ARTHUR WILLIAM WALL, a subject of the Kingdom of Great Britain, residing at "The Laurels", Lyndon End, Sheldon, near Birmingham, in the county of Warwick, England, have invented certain new and useful Improvements in or Relating to the Cranks or Crank-Shafts of Internal-Combustion Engines and to the Manufacture of the Same, of which the following is a specification.

The present invention comprehends certain improvements in or relating to the cranks or crank-shafts of internal-combustion engines and to the manufacture of the same, and comprises a composite crankshaft built up from stampings, pressings, or the like in which hollow crank pin and crankshaft portions have been produced by displacing the metal in a direction axially of said crank-pin and crankshaft. The crankshaft according to the present invention is advantageously manufactured from sheet metal blanks by pressing or stamping tubular crank-pin and crankshaft portions, the junctures between which occur at three positions, viz: those of the crank-pin, the crankshaft and the crank-arm.

In order that this invention may be clearly understood and readily carried into practice, reference may be had to the appended explanatory drawing, which illustrates in sectional elevation an embodiment of the present invention.

In a convenient embodiment of the present invention, each crank consists of two circular stampings, each involving a disk-like part $a$. In each stamping $a$ an eccentrically located projecting hollow boss $b$ is stamped. These projecting bosses are adapted to adjoin each other and constitute the crank-pin. The edges of the bosses may be serrated or formed with dogs $c$ or the like, adapted to inter-engage. $d, d$ represent two other disks similar to the disks $a$, but formed with concentric stamped bosses $e, e$. These bosses $e, e$ may have their projecting extremities formed with dogs or the equivalent adapted to inter-engage. The bosses $e, e$ constitute the intermediate parts of the crankshaft. The bosses $e, e$ and disks to which they are attached may be secured together by a sleeve $f$. Each disk $d$ is adapted to be secured to a disk $a$, as for instance by welding, riveting, or the like, and the sleeve $f$ may pass also through the disks $a$ and be swaged over the latter, to thereby brace two of the disks $a$ and the intermediate two disks $d$ together.

A screw or bolt may pass through the interior of the composite crankpin; this screw or bolt $g$ may have a countersunk head adapted to engage with one of the disks $d$, and the said screw or bolt may be screwed internally into the interior of the boss $b$ appertaining to the other disk $a$, and also if desired into the remote disk $d$. The disks and bosses are thereby effectively connected together, at the axes of the crank pins, while by removing the screw $g$ the crank-shaft may be divided into parts at the crank pin. A screw such as $g$ may be utilized to connect together the disks $d, d$, but a sleeve $f$ is preferably used in a case in which, as shown, it is desired that the crankshaft should be hollow. In the wall of this hollow part of the crankshaft, perforations $h$ are provided adapted to admit explosive mixture from a port in the stationary bearing of the crankshaft. This explosive mixture is thereby admitted to the crank chambers.

The bosses $b$ or $e$, instead of being connected as above described may be in sleeve connection, one being adapted to project into the other. The disks $a, d$ instead of being connected in the manner described, may be formed with flanges, one of which fits within the other to convert each member $a, d$ into a drum-like member.

In each or certain of the disk-like crank-arms $a, d$, an elongated, segmental, or arc-shaped opening (not shown) may be provided. This opening may be adapted to uncover an alternative arrangement of gaseous inlets provided in the crank-chamber to admit mixture or mixture and air thereto. In this embodiment the crank-arms may have a running compression-tight fit with the crank-chamber so that the gaseous ingress provision is intermittently closed and opened, the crank-arm being thus adapted to function as a rotary valve.

What I claim as my invention and desire to secure by Letters Patent is:—

1. A composite crank shaft comprising a series of disks having integral hollow bosses constituting crank pin and crank shaft portions, said bosses being formed with interengaging dogs.

2. A composite crank shaft comprising a plurality of circular disks provided with bosses stamped out therefrom at eccentric and concentric positions, the bosses at the concentric positions constituting the crank shaft and the bosses at the eccentric positions constituting the crank pins, the bosses being toothed at their ends to provide a simple connection.

In witness whereof I have hereunto set my hand.

ARTHUR WILLIAM WALL.

In the presence of—
ARTHUR H. BROWN,
EDGAR N. WHEELER.